United States Patent
Spearman et al.

(10) Patent No.: US 6,692,639 B1
(45) Date of Patent: Feb. 17, 2004

(54) STACKED CONICAL FILTRATION OR SEPARATION APPARATUS

(75) Inventors: Patrick R. Spearman, The Woodlands, TX (US); Michael R. Spearman, The Woodlands, TX (US); Majid Zia, White Bear Township, MN (US)

(73) Assignee: Porous Media Corporation, St. Paul, MN (US)

( * ) Notice: Subject to any disclaimer, the term of this patent is extended or adjusted under 35 U.S.C. 154(b) by 0 days.

(21) Appl. No.: 09/292,494

(22) Filed: Apr. 15, 1999

Related U.S. Application Data
(60) Provisional application No. 60/081,873, filed on Apr. 15, 1998.

(51) Int. Cl.[7] .............................................. B01D 29/35
(52) U.S. Cl. ................ 210/323.2; 210/450; 210/493.1; 210/497.01; 210/497.3; 210/DIG. 5
(58) Field of Search ........................... 210/314, 316, 210/323.2, 344, 448, 450, 483, 492, 497.01, 497.3, DIG. 5, 322, 323.1, 232, 493.2, 493.1; 55/484, 510, 521

(56) References Cited

U.S. PATENT DOCUMENTS

| | | | |
|---|---|---|---|
| 2,823,760 A | | 2/1958 | Andersen |
| 3,314,542 A | * | 4/1967 | Kudlaty ................ 210/323.2 |
| 3,481,473 A | * | 12/1969 | Howard .................... 210/300 |
| 3,535,853 A | * | 10/1970 | Brown et al. ............... 55/510 |
| 4,200,444 A | * | 4/1980 | Witchell .................... 55/484 |
| 4,336,043 A | * | 6/1982 | Aonuma et al. ............ 55/483 |
| 4,437,986 A | * | 3/1984 | Hutchins et al. ....... 210/DIG. 5 |
| 4,536,291 A | * | 8/1985 | Hoffmann et al. ......... 210/457 |
| 4,950,400 A | * | 8/1990 | Girondi .................... 210/335 |
| 5,141,637 A | * | 8/1992 | Reed et al. ............... 210/232 |
| 5,443,724 A | | 8/1995 | Williamson et al. |
| 5,454,945 A | | 10/1995 | Spearman |
| 5,750,024 A | * | 5/1998 | Spearman ................. 210/315 |

FOREIGN PATENT DOCUMENTS

| | | | | |
|---|---|---|---|---|
| DE | 4017071 | * | 11/1991 | ................ 55/484 |
| GB | 2070971 A | * | 9/1981 | ........... B01D/46/24 |
| GB | 2089237 A | * | 6/1982 | ........... B01D/46/08 |

* cited by examiner

Primary Examiner—Matthew O. Savage
(74) Attorney, Agent, or Firm—Marshall & Melhorn, LLC (57) ABSTRACT

A conically shaped filtration and/or separation apparatus is provided which is constructed from a stack of filters at least some of which are different sizes superposed above each, other, of said plurality of said filters in a fluid communicable relationship. A collapsible version of such conically shaped filter and/or separation apparatus is provided whereby a plurality of such filters are connected together using two piece interlocking or connecting end caps.

18 Claims, 13 Drawing Sheets

STACKED CONICAL FILTRATION OR SEPARATION APPARATUS

This application is claiming the benefit, Under 35 U.S.C. §119 (e), of the provisional application filed on Apr. 15, 1998, under 35 U.S.C. §111(b), which was granted Ser. No. 60/081,873. The U.S. provisional application No. 60/081,873 is hereby incorporated by reference.

BACKGROUND OF THE INVENTION

1. Field of the Invention

This invention relates generally to filters and filter apparatus. More particularly, the present invention relates to filtration and/or separation apparatus. Most particularly, the invention relates to a stacked conical filtration or separation apparatus.

2. Discussion of the Related Art

The advantages of a conical shaped filtration apparatus are known in the art. The conical configuration allows for lower velocity of the primary phase fluid in the area between the outside surface of the coalescing element or elements and the filter assembly inner wall thereby reducing the maximum droplet diameter which may be supported by or re-entrained in the primary phase fluid. This allows for more efficient separation of the coalesced droplets from the primary phase fluid. It also allows for lower pressure drop through the filter elements.

U.S. Pat. No. 2,823,760 to Soran K. Andersen discloses a water separator which relates generally to apparatus for separating liquids from gases or gaseous fluids, and more particularly, to apparatus for removing particles of a liquid such as a water from a gaseous fluid such air. The invention has particular utility in air conditioning systems such those employed for conditioning air delivered to air craft cabins and the like. A conically shaped condenser is positioned within a housing 11. The condenser includes a conical body portion 16, the larger end of which is provided with a radially outwardly extending flange that is positioned adjacent the flange on the housing. The cone of the condenser body portion is more obtuse than the cone of the housing 11. The condenser is thus in a spaced relationship to the inner surface of the housing, with the smaller end of the condenser being a greater distance from the housing than the larger end thereof.

U.S. Pat. No. 5,454,945 entitled "Coalescing Filter and Assembly", (and continuation Ser. No. 08/414,273) in the name of Michael R. Spearman, one of the applicants herein, shows a porous coalescing filter element of conical or frustroconical configuration disposed within a cylindrical filter housing such that the area between the element and the wall increases in the direction of the primary phase flow to keep the annular velocity substantially constant or decreasing in the direction of primary fluid flow. The element may be manufactured with a round end and tapered walls terminating to a pointed apex, but is more preferably manufactured and secured within the filter housing using flat end caps on both ends. The filter element may be vacuum formed or manufactured from media in a flat sheet form which may be pleated if desired. The specification of said U.S. Pat. No. 5,454,945 is specifically incorporated herein by reference.

It has been found under some conditions, that the surface area available from a conical configuration is not as great as expected. Thus, those skilled in the filtration art continued to search for a conically shaped filtration and/or separation apparatus with increased surface area.

SUMMARY OF THE INVENTION

A conically shaped filtration and/or separation apparatus is provided which is constructed from a stack of filters, at least some of which are different sizes, superposed above each, other, of said plurality of filters in a fluid communicable relationship.

It was found by using this construction that an extremely high surface area to volume ratio could be obtained while still obtaining the benefits of the conical shape. The high filtration surface area to volume ratio results in higher performance filter elements than the prior art in the areas of pressure drop efficiency and capacity. In addition, the compact design is easy to handle and the collapsible embodiment results in lower shipping and disposal cost. Constructions embodying a stack of tubular shaped filters are known in the prior art from the U.S. Pat. No. 5,443,724 to Willimson et. al., but there are no known patents showing a conically shaped filter made by a stack of tubular or other shaped conventional filters.

In one embodiment of the present invention, a conically shaped filter element includes a plurality of filters of finite, different, sizes, each of said plurality of filters superposed above each, other, of said plurality of filters in order of decreasing size in a fluid communicable relationship.

In another embodiment of the invention, a stacked, hour glass shaped filter element is provided, including a plurality of filters of finite, different, sizes, each of said plurality of filters superposed above each, other, of said plurality of filters, first in order of decreasing diameter, and then in order of increasing diameter, in a fluid communicable relationship.

In a further embodiment of the invention, a stacked filter element is provided including a plurality of filters of different sizes, at least one of said plurality of filters being of a different size than any of the rest of said plurality of filters, and at least one of said plurality of filters being made of a different media than any of the rest of said plurality of filters, each of said plurality of filters superposed above each, other, of said plurality of filters in a fluid communicable relationship.

In another embodiment of the present invention, a filter assembly comprising a stacked separation and/or coalescing filter element is provided, including means for introducing the fluid to be filtered into the interior of said filter element at the inside thereof such that the fluid will flow from the inside to the outside of the filter element, and wherein said filter element has its end substantially closed by a pair of closure members, and is mounted inside a suitable filter housing having inlet means sealingly communicating with the interior of said filter element, and outlet means communicating with the atmosphere.

In yet another embodiment of the present invention, a collapsible conical filter and/or separator element is provided including a plurality of filters of different sizes, said filters being chosen such that the outside diameter of each of said plurality of filters will be substantially the same as the inside diameter of the next larger of said filters so that each of said filters will fit inside one of the others of said plurality of filters when arranged in order of increasing size. Each of said plurality of filters, except for the largest and smallest of said filters, including a filter media of a predetermined size, an upper end cap potted onto said filter media, and a lower end cap potted onto the lower end of said filter media.

In a further embodiment of the present invention, a tubular filter element is provided, said tubular filter element including a filter tube, an upper end cap sealingly attached to the upper end of said filter tube, said upper end cap including a central opening to provide for fluid communication, a downward facing annular groove in sealing communication with the upper end of said filter tube, and a second or female portion of a connecting means to be engaged by a first or male portion of a connecting means on a lower end cap on another filter element. A lower end cap is provided which is sealingly attached to the lower end of said filter tube, said lower end cap including a central opening to provide for fluid communication, an upwardly facing annular groove in sealing communication with the lower end of said filter tube, and a first or male portion of a connecting means to engage a second or female portion of a connecting means on an upper end cap on another filter element.

Therefore, it is an object of the present invention to provide an improved, conically shaped, stacked, filter and/or separator.

A further object of the present invention is to provide a conical filter and/or separator having a high surface to volume ratio, and compact design.

A still further object of the present invention is to provide a collapsible conical filter or separator which is easy to handle and results in lower shipping and disposal costs.

Further objects and advantages of this invention will be apparent from the following description and appended claims, reference being made to the accompanying drawings forming a part of the specification, wherein like reference characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENT

Figure 1:
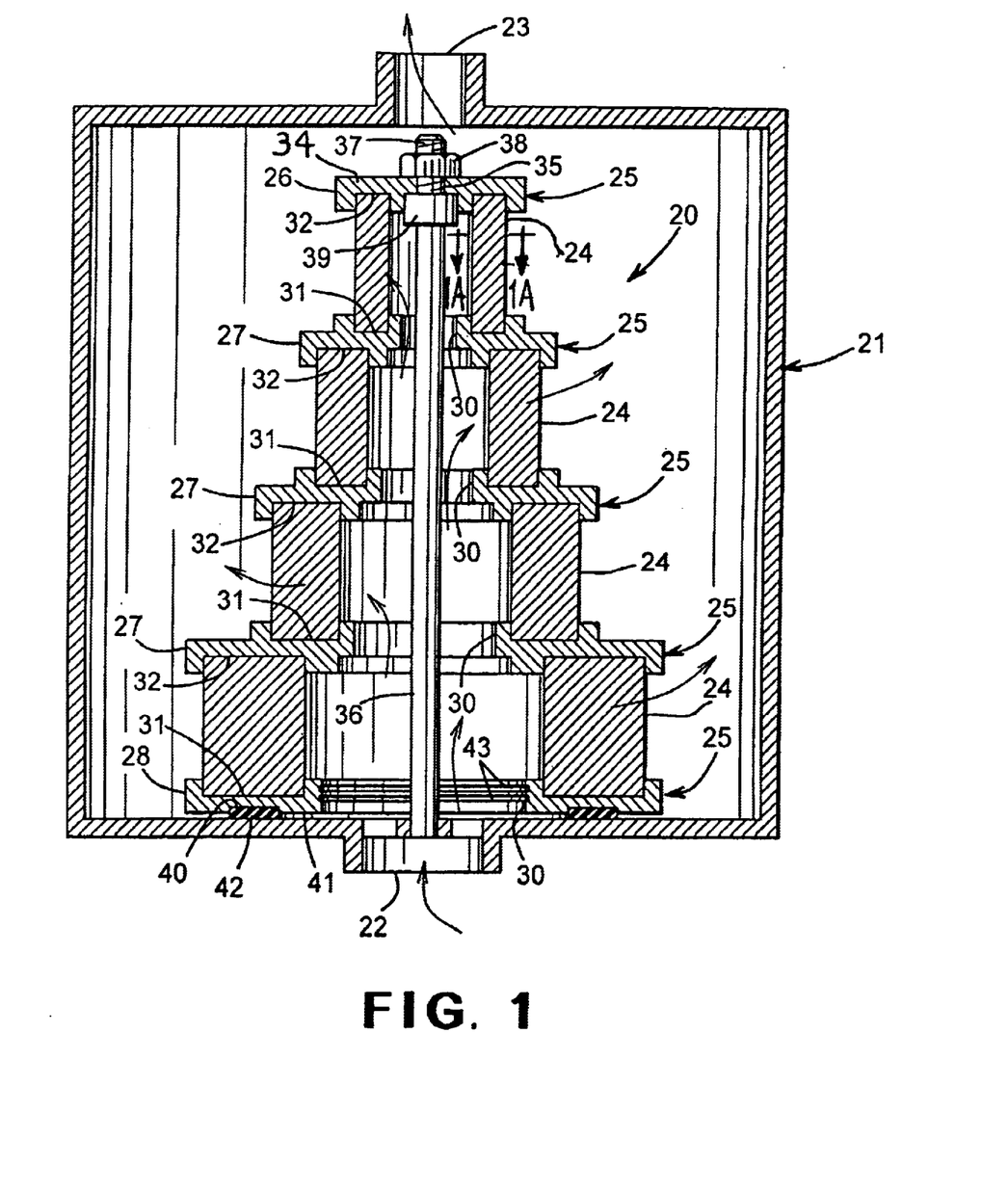
FIG. 1 is a vertical sectional view of a stacked conical filter element embodying the construction of the present invention and mounted inside a suitable housing.
Figure 1A:
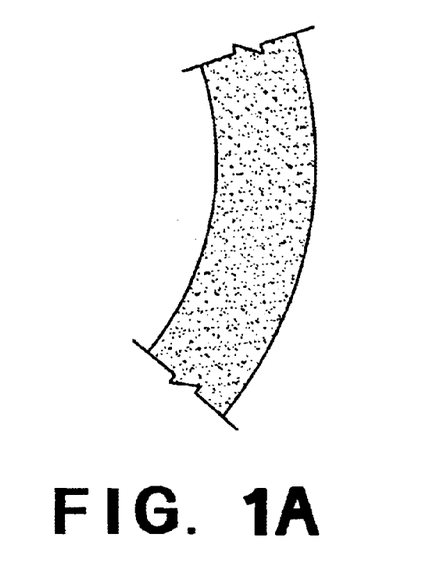
FIG. 1A shows a cross-sectional view along section line 1A—1A shown in FIG. 1 of a solid cylindrical embodiment of the filter.
Figure 1B:
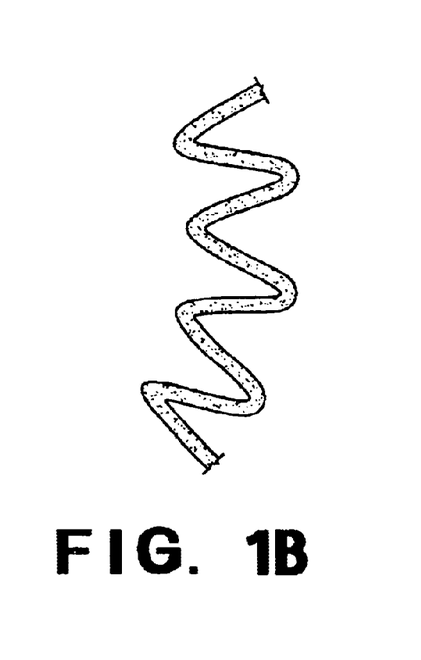
FIG. 1B shows a cross-sectional view along line 1A—1A shown in FIG. 1 of pleated embodiment of the filter.

Referring to FIG. 1, there is shown a stacked, conically shaped, filter element generally designated by the numeral 20. The element 20 may be a filter, a separator, a coalescer or any other type of filter construction. The stacked filter element 20 is mounted within a housing 21 having an inlet 22 and an outlet 23. The stacked element 20 is made up of a plurality of filters or separators 24, separated by end caps 25.

In addition to the filters 24 performing a filtration, separation, coalescing, or other function, it should be understood by those skilled in the art that the filters 24 may be made of any practicable media. Further, for purposes of description and ease of understanding of the present invention, the filters will be considered to be tubular, although they may be of any desired shape, such as square, circular, octagonal, oval, etc. and still be well within the scope of the present invention. Some of the filters 24 may be made of different media than others of the filters 24.

The stacked conically shaped filter element 20 is therefore made out of a plurality of filters 24, at least some of which are of finite, different, sizes. Each of said plurality of filters 24, is superposed above each, other, of said plurality of filters 24 in order of decreasing size in a fluid communicable relationship. Preferably, each of said plurality of filters 24 is arranged coaxially with each, other, of said filters 24. However, the coaxial arrangement is only the preferred arrangement, and a non-coaxial arrangement may be used, if desirable.

Each of said plurality of filters 24 is separated from each, other, of said filters by an end cap generally designated by the numeral 25. The upper most filter 24 and the lower most filter 24 also have an end cap 25. The end caps 25 therefore are basically of three types. An upper most end cap 26, intermediate end caps 27, and lower most end cap 28.

The intermediate end caps 27 are all virtually identical, except that they have different diameters to accommodate the different sizes of tubular filters 24 which make up the stack. Each of said separating or intermediate end caps 27 has a central opening 30 to provide for fluid communication between the different filters 24, an upper annular groove 31 in sealing communication with a lower end of a filter 24, and usually a larger diameter lower annular groove 32 in sealing communication with the upper end of a larger filter 24.

The upper most end cap 26 has a lower annular groove 32 in communication with the upper most filter 24, and is provided with a center opening 35 to accept a threaded rod or tube 36 having a threaded end 37 to accept a nut or other fastening means 38 to apply downward pressure to the element 20 and seal it against the bottom of the housing 21. Collar 39 prevents over tightening.

The sealing of the element 20 into the housing 21 is aided by the special construction of the lower most or bottom end cap 28 which, in addition to a single upper annular groove 31, may be provided with annular sealing groove 40, located in the bottom surface 41 of the lower most end cap 28. Gasket 42 is located in groove 40.

Alternate sealing means may be provided in the end cap by way of a one or a pair of O-ring grooves 43 provided in the central opening 30 of lower most end cap 28. O-rings 48 (FIG. 3) may be located in these grooves. The end caps 25 may be made of a wide range of material such as polyethylene, polypropylene, polyester, nylon, polytetrafluoroethylene, polyvinylidine fluoride, and polyamide, as well as others. The O-rings 48 may be made of any of the different types of materials used for O-rings such as nitrile, silicone, ethylene, propylene diene, polytetrafluoroethylene, neoprene, isoprene, flurosoilicone or perfluoroelastomers, as well as others. The filters 24 may be wrapped, pleated, molded or manufactured in any other way known in the art.

The filter element 20 may be made by assembling sereatim the lower end cap 28, filter 24, any number of intermediate end caps 27 with filters 24 therebetween, and an upper most end cap 26 over the rod 36. The nut 38 is then screwed on the threads 37 and tightened to seal the filter element 20 in the housing 21. Sealing means may be provided in upper annular grooves 31 and lower annular grooves 32 if the components are assembled as above. It is also possible for the stacked conical filter element 20 to be made as a unit and have the end caps 25 potted, bonded, or otherwise secured onto the filters 24, with the entire stacked conical element 20 inserted as a one piece unit into the housing 21.

Figure 2:
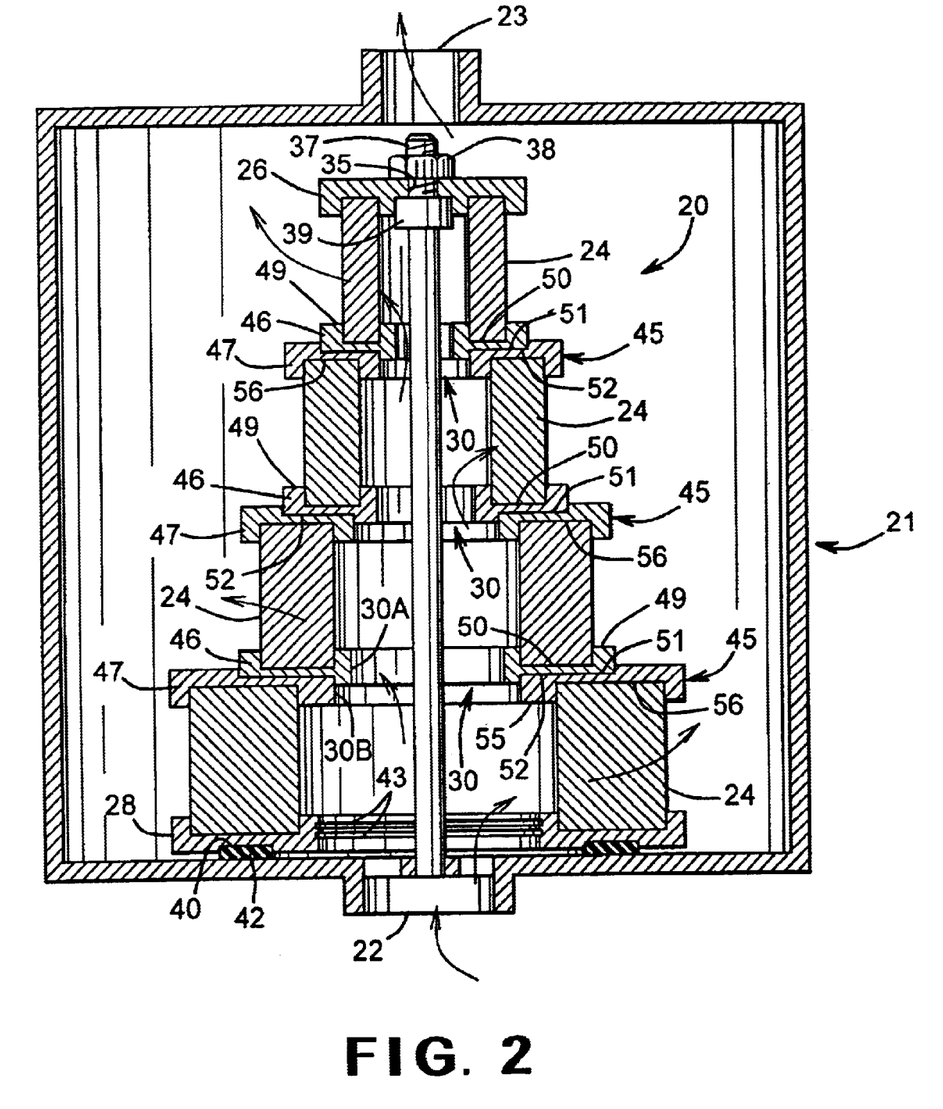
FIG. 2 is a vertical sectional view of a modification of the construction shown in FIG. 1.

A modification of the invention is shown in FIG. 2. The stacked conically shaped filter element 20 shown in FIG. 2 is substantially identical to the stacked conically shaped element 20 of FIG. 1 except that the intermediate end caps 27 have been replaced by intermediate stacking or nesting end caps 45. The upper most end cap 26 and the lower or lower most end cap 28 are identical to those shown in FIG. 1.

Each of the intermediate nesting end caps 45 has an upper portion 46 and a lower portion 47. Each of said upper portions 46 of the intermediate nesting end caps 45 has a top surface 49 having an upper annular groove 50 formed therein and a stepped lower surface 51. Each lower portion 47 of the intermediate or nesting end cap 45 has a complimentary stepped upper surface 52 which is complimentary in shape to the lower stepped surface 51 of the upper portion 46 such that the upper portion 46 nests in the lower portion 47. The lower portion 47 has a bottom or lower surface 55 having a lower annular groove 56 provided therein which is in sealing contact with the filter 24. As before, the various end caps 26, 45, 28 may sealingly engage the filters 24 or be potted, bonded, or otherwise secured thereon.

Central opening 30 now is formed by an upper central opening portion 30A provided in each upper portion 46 of end cap 45, and a lower central opening portion 30B, which may be somewhat larger, as illustrated formed in the lower portion 47 of nesting end cap 45.

Figure 3:
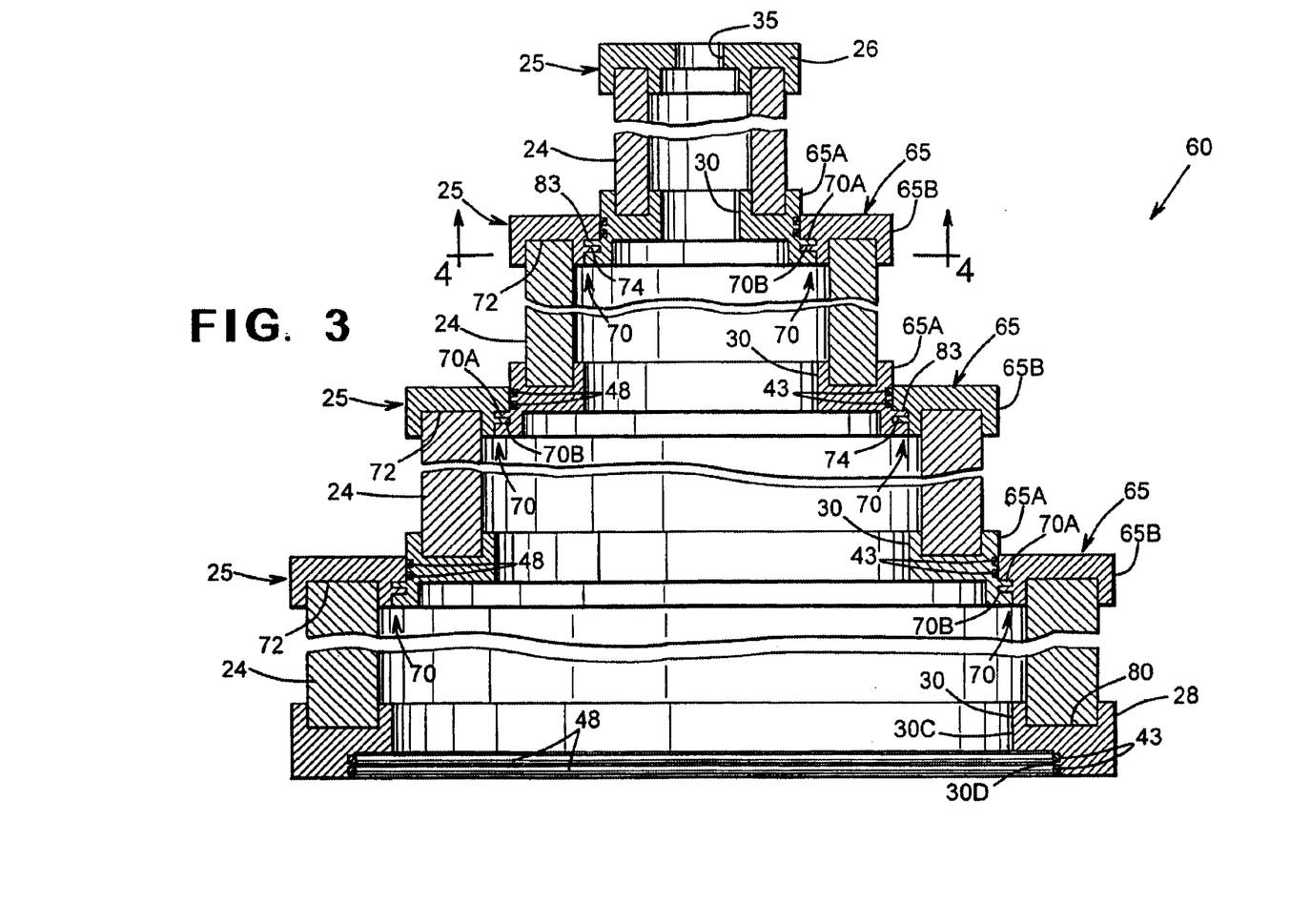
FIG. 3 is a vertical sectional view of a further modification of the invention showing a collapsible, stacked, conical filter.

Referring now to FIGS. 3–7A there is shown a collapsible stacked conical filter or separator element 60. Several portions of the construction of FIG. 3 are similar to that shown in FIGS. 1 and 2. For example, the various filters or separators 24 may be identical, except at least one will be of a different diameter. The media of the filters 24 may all be identical, or some may be different than others. The upper or upper most end cap 26 and the lower or lower most end cap 28 may also remain the same. For purposes of illustration, the sealing groove 41 and gasket 42 have been omitted from lower end cap 28, while O-ring grooves 43, and O-rings 48 are shown mounted in central opening 30 having upper portion 30C, and larger lower portion 30D.

The intermediate end caps 27 or nesting end caps 45 have been now replaced by connecting or interlocking end caps 65. Connecting or interlocking end caps 65 are so described because each consists of an inner portion 65A connected to an outer portion 65B by interlocking or connecting means 70.

Figure 6:
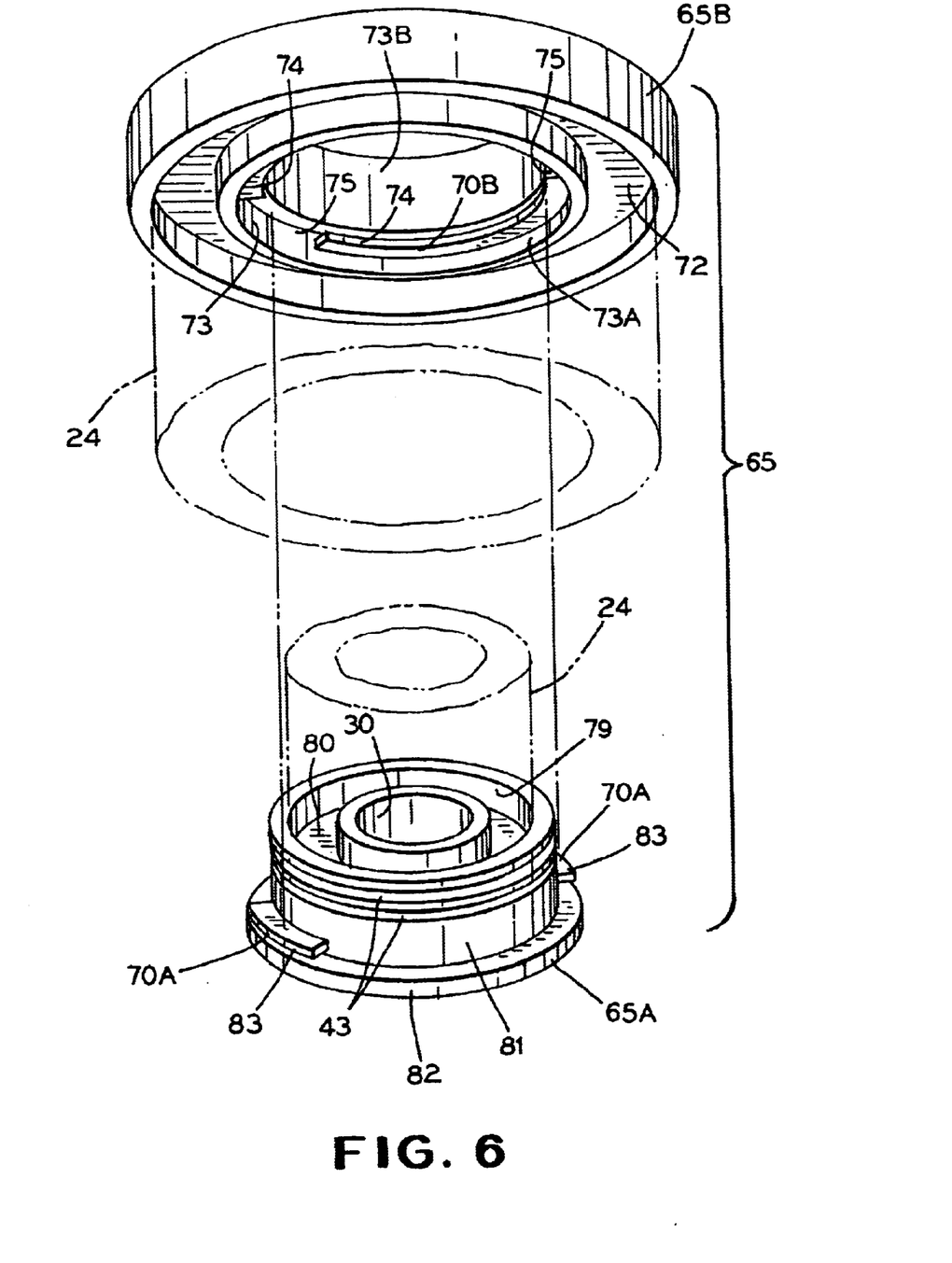
FIG. 6 is a partial perspective view showing the connecting or interlocking means used to connect the filter elements of FIG. 3.

Each inner portion 65A of the connecting or interlocking end cap 65 has a first or male portion 70A of an interlocking or connecting means 70 formed thereon (FIG. 6).

Each outer portion 65B of the connecting or interlocking end cap has a second or female portion of an interlocking or connecting means 70B formed thereon. Each outer portion 65B of the interlocking or connecting end caps 65 includes a downwardly facing groove 72 which will be in sealing communication with the upper end of a filter 24 by use of any means well known in the art. A stepped inner radial wall 73 is provided centrally of the outer portion 65B of connecting end cap 65.

The second or female portion of the interlocking or connecting means 70 is formed by a pair of opposed ribs 74 projecting radially inward from said inner radial wall. Inwardly projecting opposed ribs 74 are separated by gaps 75 for purposes to be explained hereinafter.

Inner portion 65A of connecting or interlocking end cap 65 has an upwardly facing annular groove 80 which will be in sealing contact with the bottom end of a filter 24 by use of any means well known in the art. Central opening 30 will provide for fluid communication through the interlocking or connecting end cap 65. Inner and. outer radial walls (79, 81) are provided in a spaced concentric relationship with the upwardly facing annular groove 80. A perimetrical flange 82 is provided at the lower extremity of the outer radial wall 81, and a pair of radially outwardly projecting opposed ribs 83 form the first or male portion 70A of the interlocking or connecting means 70.

As shown in FIG. 6, to connect inner portion 65A to outer portion 65B, the radially outwardly projecting ribs 83 are inserted through the gaps 75 between the radially inwardly projecting ribs 74, and then the lower portion 65A is twisted or rotated in relation to the outer portion 65B (or vice versa) to connect the inner portion 65A of the connecting or interlocking end cap to the outer portion 65B thereof. Each of the interlocking or connecting end caps 65 shown in FIG. 3 is of a similar construction, only the diameters are different.

Figure 5:
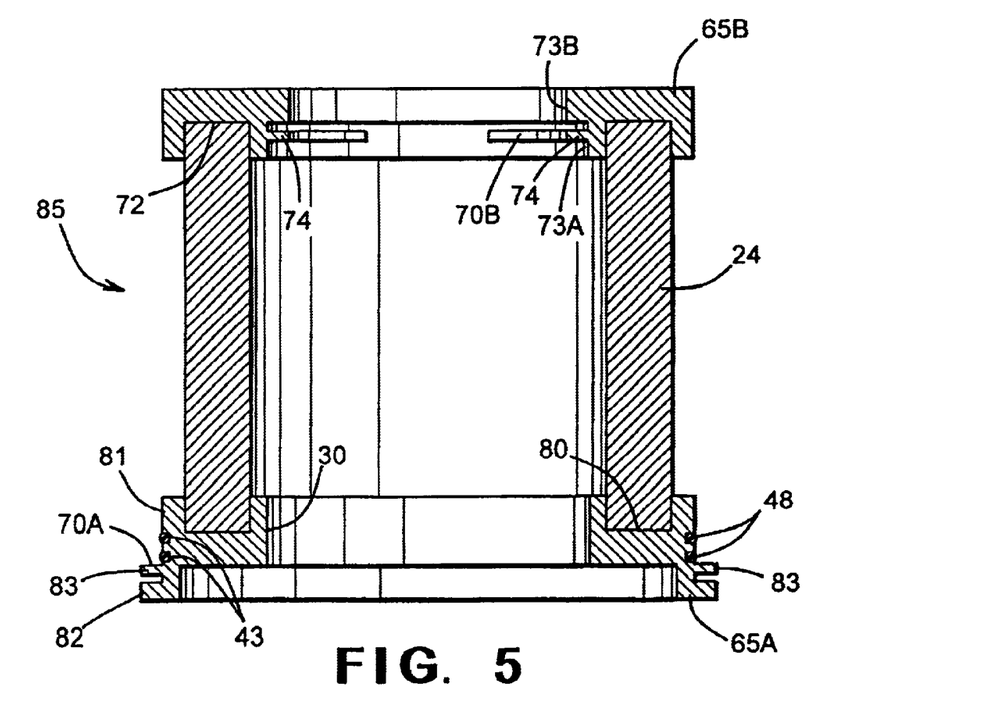
FIG. 5 is vertical sectional view, on an enlarged scale, of one of the interlocking elements shown in FIG. 3.

Referring now to FIG. 5, the construction of FIG. 3 may be composed of a series of preassembled tubular filter elements 85. Each tubular filter element 85 will have a tubular filter or separator or coalescer or other element 24 interposed between an inner portion 65A of a first or interlocking or connecting end cap 65, and a outer portion 65B of another or second interlocking end cap 65. Similarly to that shown in FIG. 3, the filter 24 will be contained within a downwardly facing annular groove 72 in the outer portion 65B of a connecting or interlocking end cap 65, and an upwardly facing annular groove 80 in inner portion 65A of another interlocking end cap.

Figure 7:
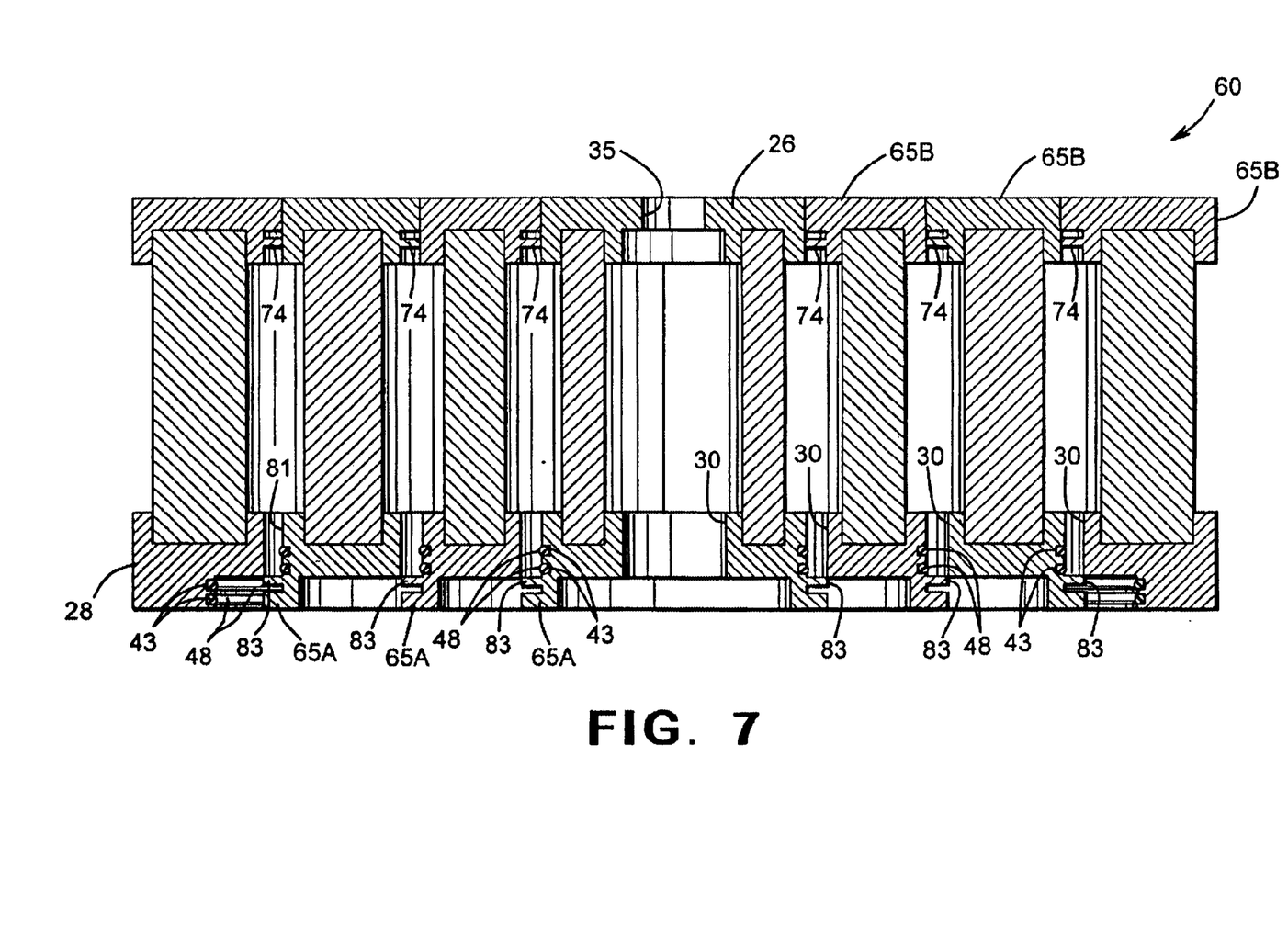
FIG. 7 is a vertical sectional view of the construction shown in FIG. 3 in its collapsed or storage condition.

A novel construction can be achieved if the outside diameter of outer portion 65B of second interlocking or connecting end cap 65 is chosen to be about the same diameter as the outer radial wall 81 of the inner portion 65A first or interlocking end cap 65 (FIGS. 5 and 7). This allows each of said plurality of tubular filter elements to be superposed above each other of said plurality of tubular filter elements in order of decreasing size in a fluid communicable relationship when assembled as shown in FIG. 3, but also allows shipping of the construction shown in FIG. 3 in the configuration shown in FIG. 7. Since the volume of the construction shown in FIG. 7 is so much less than the volume of the construction shown in FIG. 3, shipping costs will be much lower.

Figure 3A:
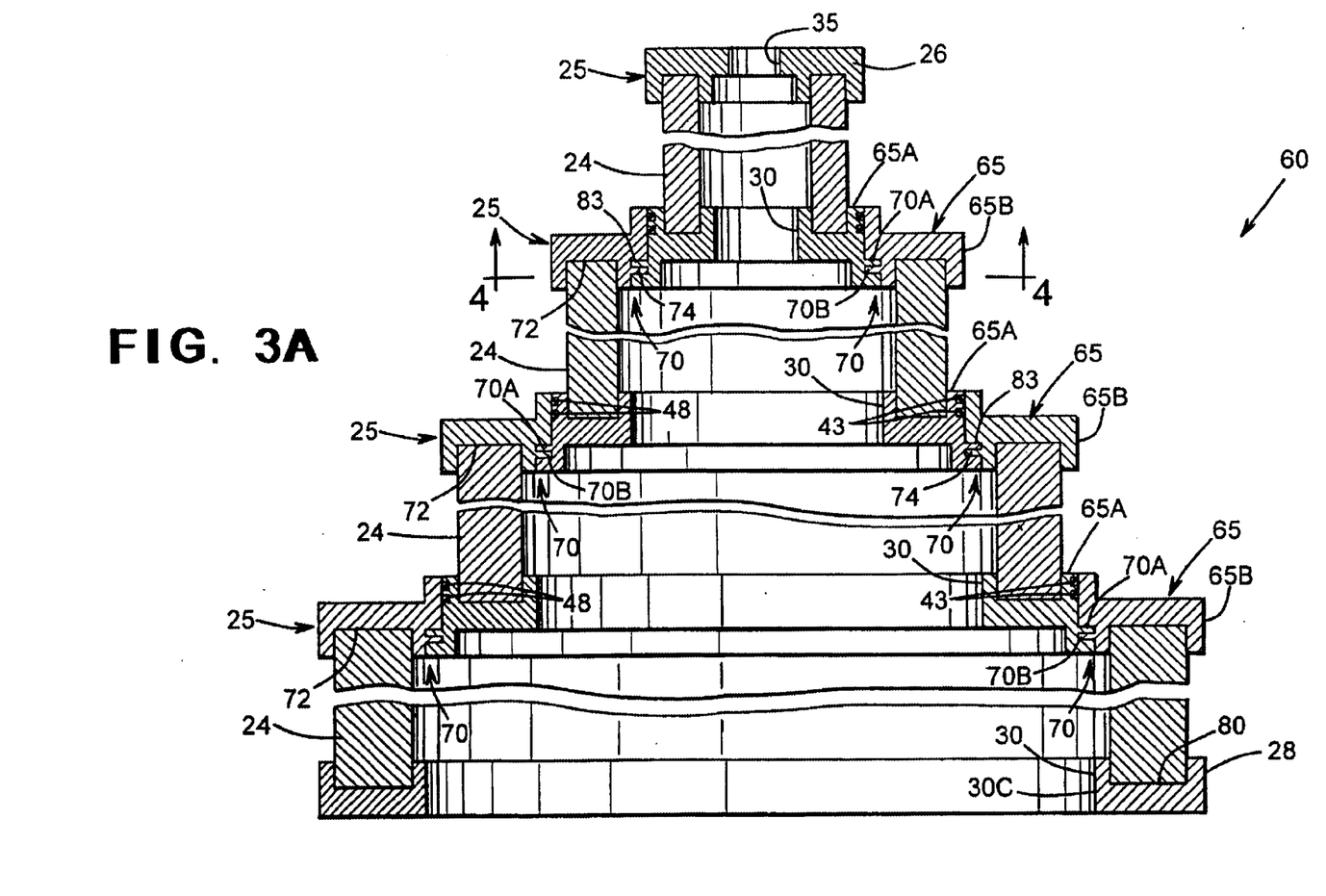
FIG. 3A is a vertical sectional view of a modification of the construction shown in FIG. 3.
Figure 4:
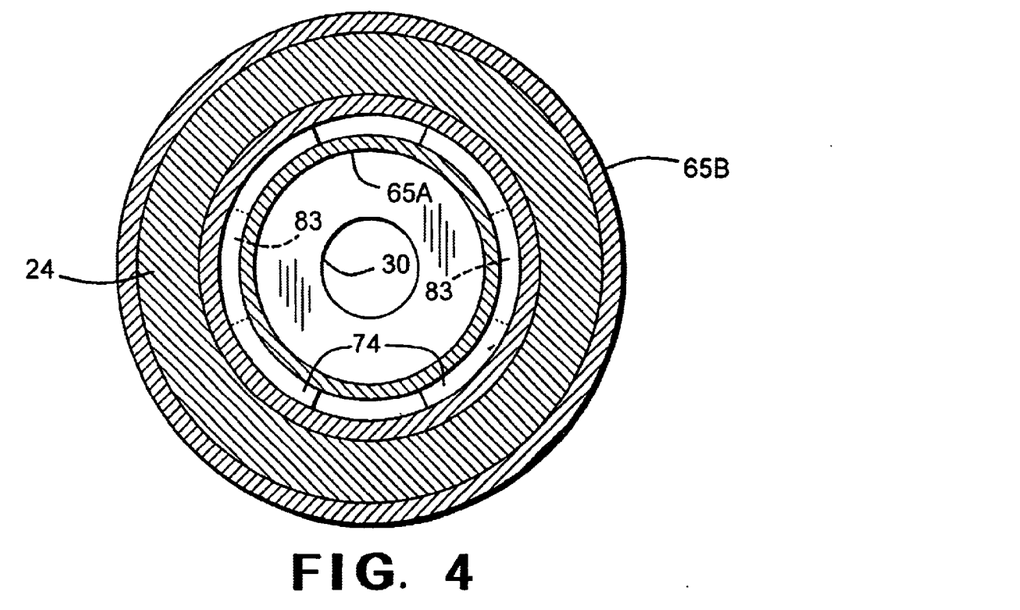
FIG. 4 is a sectional view taken in the direction of the arrows along the section line 4—4 of FIG. 3.
Figure 7A:
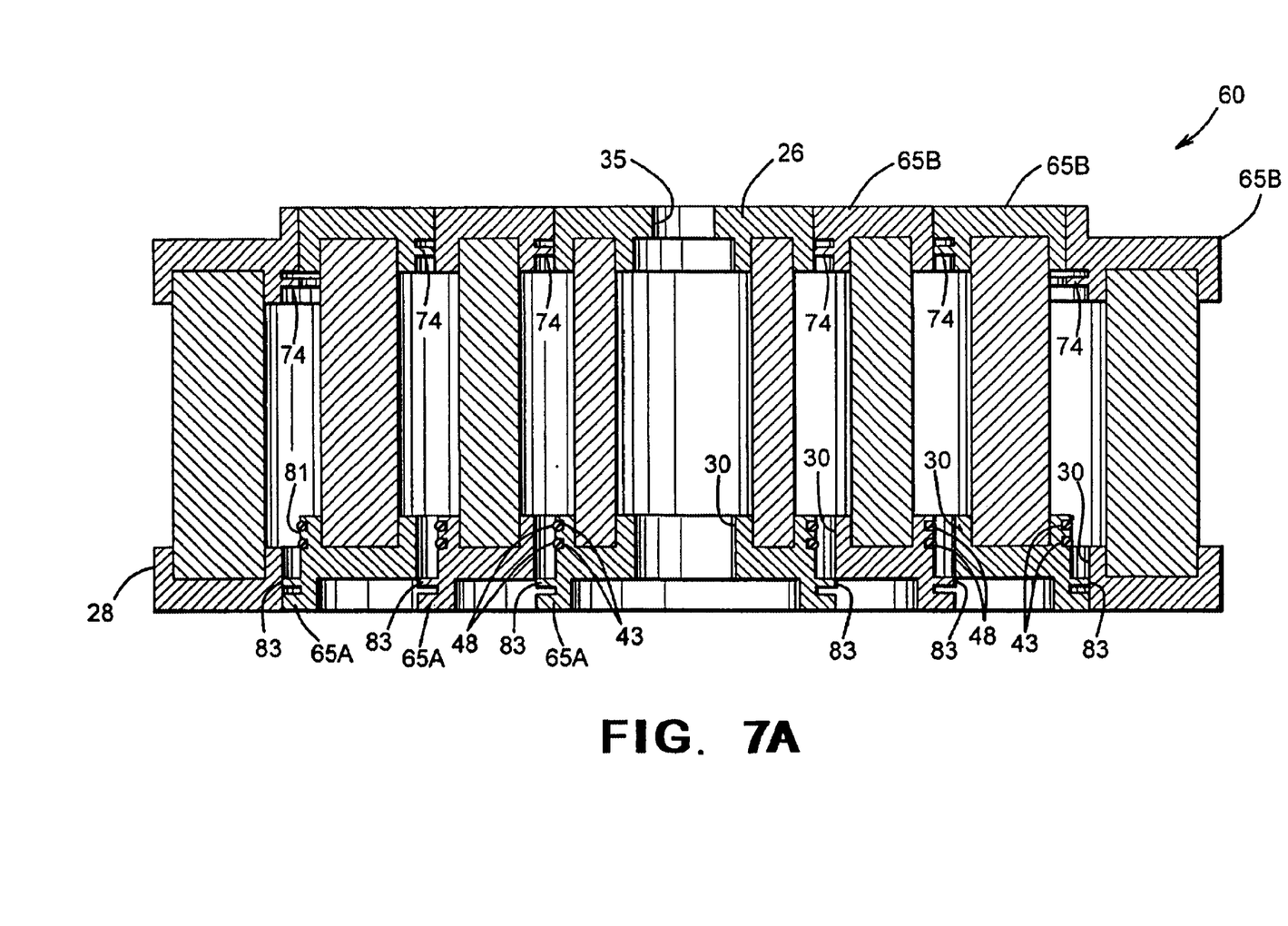
FIG. 7A is a vertical sectional view of the construction shown in FIG. 3A in its collapsed or storage condition.

While the embodiment of the collapsed, stacked, conically shaped filter element 60 shown in FIGS. 3 & 7 is desirable from shipping and storage considerations because of its' completely flat top surface, if the size of the filter, or other considerations, render such flat top surface not critical, it is well within the scope of the present invention that the stacked, conically shaped filter element have the configuration shown in FIGS. 3A & 7A, or other suitable configuration, depending on the application.

In the embodiment of the collapsed, stacked, conically shaped filter element 60 shown in FIGS. 3A & 7A, the O-ring grooves 43 are moved higher up on the outer radial wall 81, and to provide a sealing surface. The upper portion 73B of the inner radial wall 73 found on the outer portion 65B of the connecting or interlocking end cap 65 is extended. From the foregoing it will be obvious to one skilled in the art that many different configurations connected by many different connecting means are well within the scope of the present invention.

Figure 8:
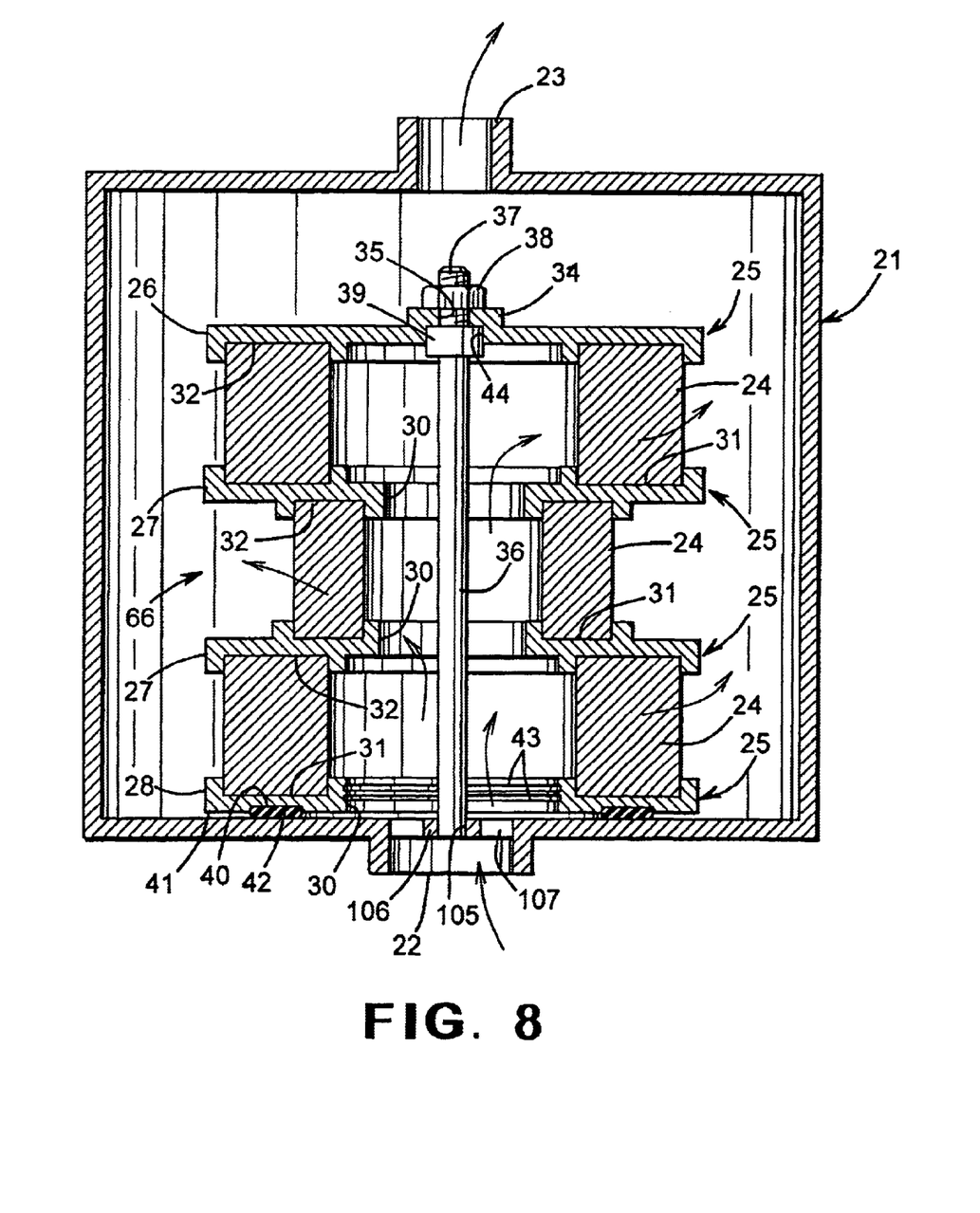
FIG. 8 is a vertical sectional view of a modification of the construction shown in FIG. 1, illustrating an hour-glass shaped filter element.

In some applications, an hour glass shaped filter element may be useful. Referring to FIG. 8, there is shown a stacked hour glass shaped filter element 66 mounted in a housing 21 having an inlet 22 and an outlet 23. As before, a threaded rod or tube 36 is mounted in an opening 105 provided in a central portion 106 supported by a web 107 in inlet 22. The hour glass shaped filter element 66 is formed of a plurality of filters or separators 24 separated by end caps 25. The end caps illustrated are most similar to those used in FIG. 1, and thus the numeral 26 will be used for the upper most end cap. The numeral 28 will be used for the lower most or lower end cap, and the numeral 27 will be used for the intermediate end caps. In this modification of the invention, the upper most end cap 26 and the lower most end cap 28 are preferably of the same diameter and are of somewhat similar appearance.

In lower most end cap 28 there is an annular groove 31 formed by a pair of concentric upstanding radial walls 101. Inwardly of innermost upstanding radial wall 101 is a central opening 30 having a pair of O-ring grooves 43 therein. An annular sealing groove 40 is provided in the lower surface 41 of lower most end cap 28 and a gasket 42 is located therein. Each of the intermediate end caps 27, which may be mirror images of each other, will have an upper annular groove 31 formed in the manner just described, and a lower annular groove 32. Each filter 24 is constrained between a lower annular groove 31 and an upper annular groove 32 in another end cap. Central openings 30 in intermediate end caps 27 provide fluid communication throughout the hour glass shaped filter element 66.

In this modification of the construction, upper most end cap 26 has a downwardly facing annular groove 32 as before. Center opening 35 is provided in raised boss 34 which forms part of collar recess 44 in which the spacer collar 39 rests. Nut 38 tightened onto threaded portion 37 of rod 36 provides the necessary tension on the stacked hour glass shape filter element 66 to provide for sealing. As before, all of end caps 25 may be bonded, sonically welded, adhesively attached or otherwise fastened to the elements 24 by means well known in the art.

Figure 9:
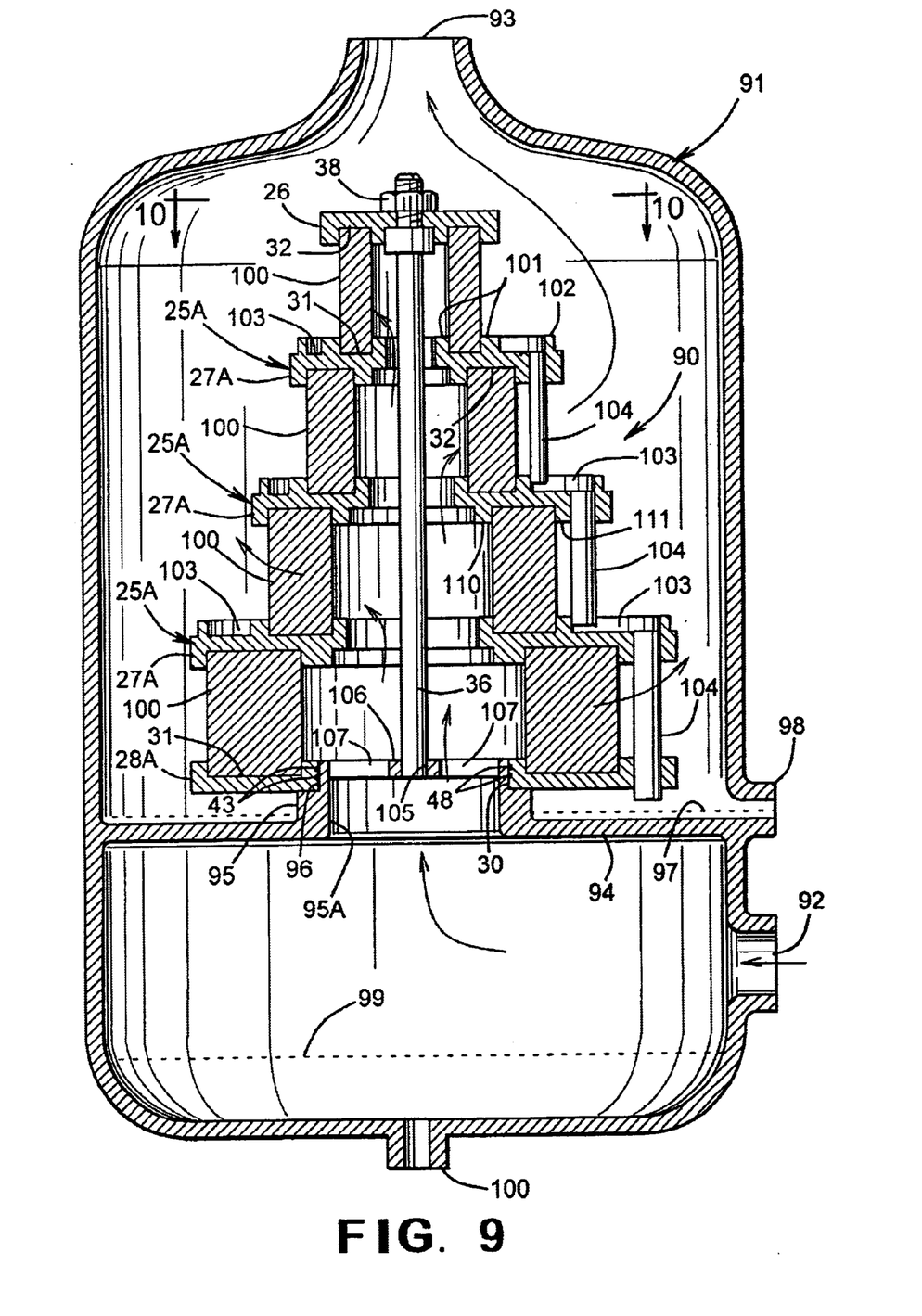
FIG. 9 is a vertical sectional view of a modification of the construction shown in FIG. 1, utilizing coalescing elements and mounted in a housing.
Figure 10:
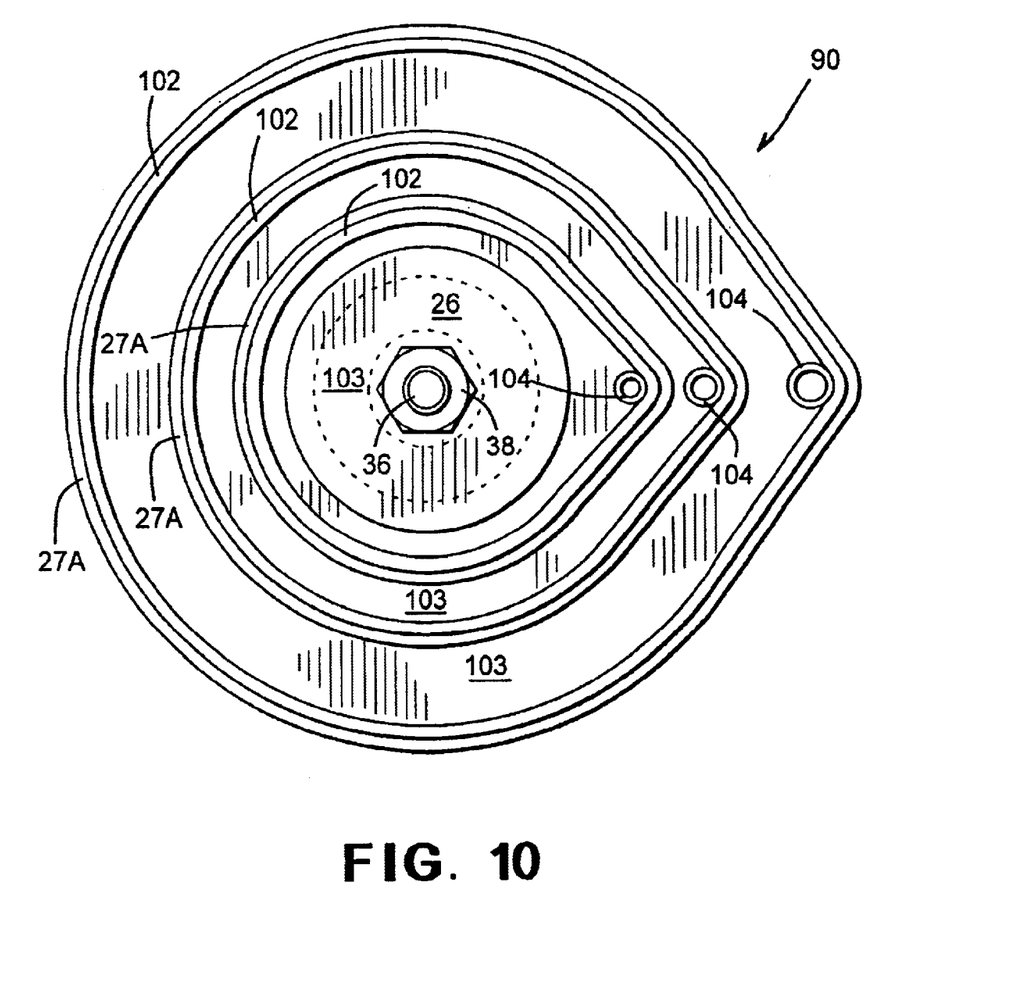
FIG. 10 is a top plan view of the coalescing element shown in FIG. 9.

Referring now to FIGS. 9 and 10, there is shown a modification of the construction of the present invention which is useful in the coalescing filter field. In use, it is desirable to drain the coalescing element 90 shown inside housing 91. Housing 91 has an inlet 92 and an outlet 93, separated by a tube sheet 94. Tube sheet 94 may have one or more risers 95, having central opening 95A, to hold one or more coalescing elements 90.

Riser 95 has a stepped exterior radial wall 96 having an outer diameter substantially the same as the inner diameter or central opening 30 of lower most end cap 28A. As before, one or more sealing grooves 43 is provided, in which O-rings 48 are located. An upper sump 97 is provided below said coalescing element 90, and an upper drain 98 is in fluid communication with the upper sump. A lower sump 99 is provided below the level of inlet 92, and a lower drain 100, is in fluid communication with said lower sump. Automatic drain valves (not shown) may be provided on both drains, if desired.

Figure 9A:
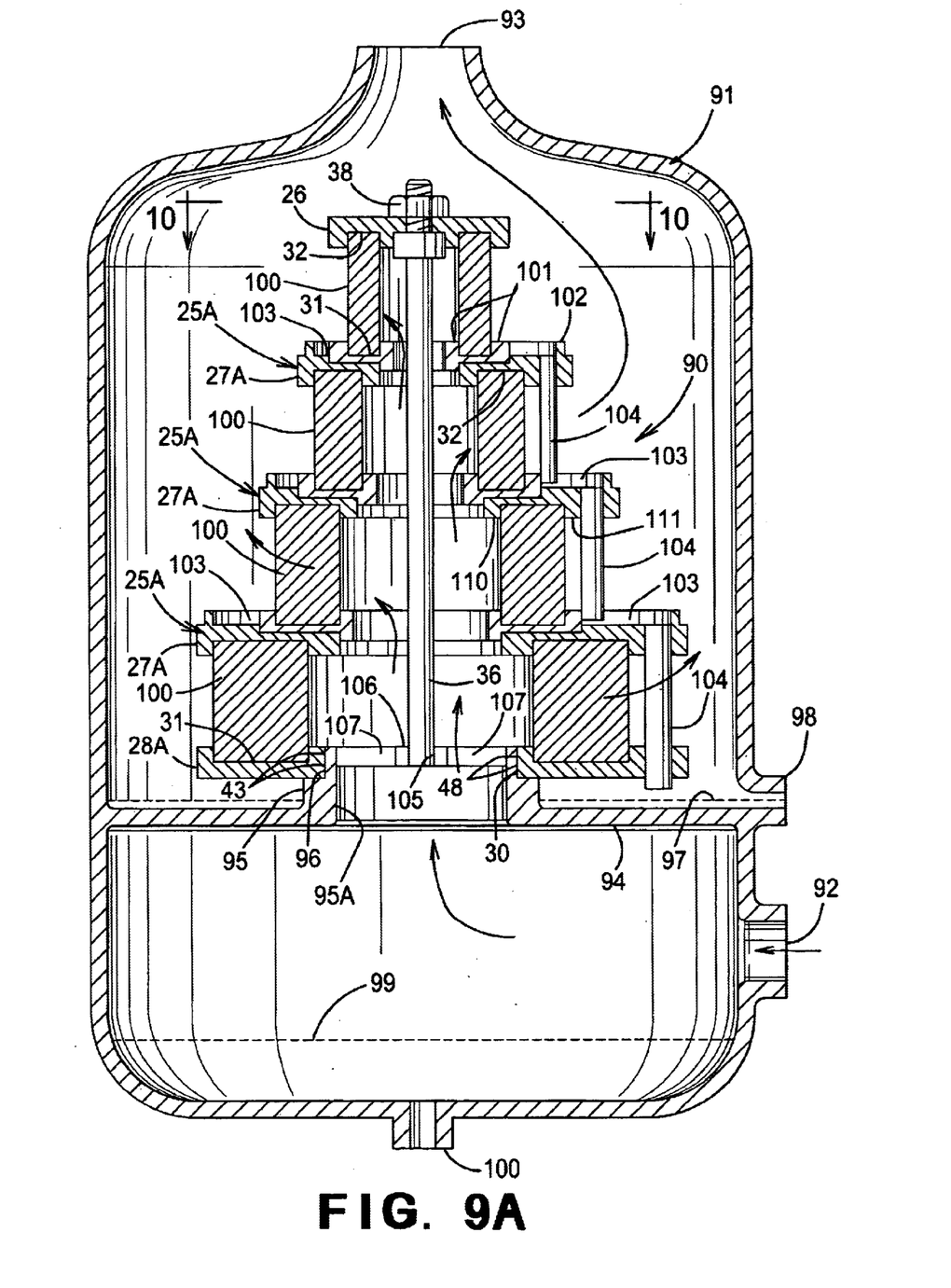
FIG. 9A shows a modification of the construction shown in FIG. 9 having two-piece end caps shown in FIG. 2.

The modified end caps 25A of the construction shown in FIG. 9 are most similar to the end caps 25 shown in FIG. 1, although the modified end caps 47 shown in FIG. 2, or other type of end cap construction may be used if desired as shown in FIG 9A. The end caps 25A (except for upper end cap 26), are of a modified tear drop shape as shown in FIG. 10. For ease of understanding, the upper most end cap 26 which may be identical to that shown in FIGS. 1, 2 or 3, has been indicated by the numeral 26 in FIG. 8, while the modified lower or lower most end cap 28 has been indicated by the numeral 28A, and the intermediate end caps have been indicated by the numeral 27A.

Lower most end cap 28A, as in FIG. 1, has an upper annular groove 31 formed therein which is in sealing communication with the coalescing filter 100. Also, as before, upper most end cap 26 has a downwardly facing annular groove 32 which is in sealing communication with the upper most coalescing filter 100.

Intermediate end caps 27A are of a modified construction when compared with FIG. 1. They are of a tear drop shape, and have the upper annular groove 31 formed by a pair of concentric upstanding walls 101. However, the outer most upstanding concentric wall 101 is encircled by a tear drop shaped perimetrical upstanding wall 102, leaving the space therebetween to form sump 103.

A drain tube 104 is in fluid communication with each sump 103 such that when a mixture to be coalesced passes through the coalescing filter 100, and a fluid is coalesced while passing through the media making up the element 100 into drops large enough to drain on the downstream side, or outside, of the filter 100, it drains into the sump 103. By successively draining through sumps 103 in the intermediate end caps 27A, and a hole in lower most end cap 27A, each individual coalescing element 100 will be drained into the upper sump 97, which is in fluid communication with the upper drain 98.

As before, rod 36 is fixedly mounted in opening 105 contained in a central section 106 supported by web 107. Each lower annular groove 32 is formed between a first down standing wall and a second down standing wall 110 and 111 respectively. While the first down standing wall 110 is annular in shape the second down standing wall 111 will have a modified tear drop shape consistent with the shape of the modified intermediate end cap 27A.

Thus, by careful consideration of the advantages and disadvantages of conical element design, I have developed a novel, conically shaped, stacked filter or separator apparatus.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A stacked, conically shaped filter element including an uppermost tubular filter having an uppermost end cap, and a lowermost tubular filter having a lowermost end cap, said uppermost tubular filter and said lowermost tubular filter separated by at least one intermediate tubular filter, said uppermost tubular filter, said at least one intermediate filter and said lowermost tubular filter superimposed above each other, in order of decreasing diameter, in a fluid communicable relationship, wherein each of said at least one intermediate tubular filters has an upper and a lower end cap, the inner diameter of each of said intermediate tubular filters being less than the inner diameter of an adjacent lower tubular filter, and the outer diameter of each of said intermediate tubular filters being less than the outer diameter of said adjacent lower tubular filter, but greater than the inner diameter of said adjacent lower tubular filter, thereby forming a conically shaped filter element from a plurality of tubular filter elements of differing diameters superimposed one above the other.

2. The device described in claim 1, wherein each of said plurality of tubular filter elements is arranged coaxially with each, other, of said filters.

3. The device defined in claim 2, wherein at least one of said plurality of tubular filter elements is a coalescing filter.

4. The device defined in claim 2, wherein at least one of said plurality of tubular filter elements is a separation filter.

5. The device defined in claim 1, wherein each of said end caps are in sealing communication with an end of at least one of said plurality of tubular filter elements.

6. The device defined in claim 5, wherein each of said end caps, except for said uppermost end cap and said lowermost end cap, engage a top end of one of said plurality of tubular filter elements, and a bottom end of the next smaller of said plurality of tubular filter elements.

7. The device defined in claim 6, wherein each of said end caps, except for said uppermost end cap and said lowermost end cap, each have an upper annular groove, and a lower annular groove.

8. The device defined in claim 7, wherein each of said end caps, except for said uppermost end cap and said lowermost end cap, is of a modified teardrop shape and includes:
   a) an upper annular groove formed by a first upstanding wall, and a second upstanding wall in a parallel, spaced, relationship to said first upstanding wall,
   b) an upstanding perimetrical wall, surrounding said second upstanding wall the space between said upstanding perimetrical wall and said second upstanding wall forming a reservoir, and
   c) a drain tube in fluid communication with said reservoir.

9. The device defined in claim 7, wherein at least one of said filters is pleated.

10. The device defined in claim 7, wherein each of said end caps, except for said uppermost and said lowermost end cap, are two piece end caps, each of said two piece end caps comprising:
    a) an upper portion containing said upper annular groove, and
    b) a lower portion containing said lower annular groove, said upper portion nesting in said lower portion.

11. The device defined in claim 10, wherein each of said end caps, except for said uppermost end cap, and said lowermost end cap, is of a modified teardrop shape and includes:
    a) an upper annular groove formed by a first upstanding wall, and a second upstanding wall in a parallel, spaced, relationship to said first upstanding wall,
    b) an upstanding perimetrical wall surrounding said second upstanding wall, the space between said upstanding perimetrical wall and said second upstanding wall forming a reservoir, and
    c) a drain tube in fluid communication with said reservoir.

12. The device defined in claim 10, wherein at least one of said filters is pleated.

13. The device defined in claim 7, wherein each of said end caps, except for said uppermost end cap and said lowermost end cap, are two piece end caps, each of said two piece end caps comprising:
    a) an upper portion containing said upper annular groove, and
    b) a lower portion containing said lower annular groove, said lower portion interlocking with said upper portion.

14. The device defined in claim 13, wherein each of said end caps, except for said uppermost end cap and said lowermost end cap, is of a modified teardrop shape and includes:
    a) an upper annular groove formed by a first upstanding wall, and a second upstanding wall in a parallel, spaced relationship to said first upstanding wall,
    b) an upstanding perimetrical wall surrounding said second upstanding wall, the space between said upstanding perimetrical wall and said second upstanding wall forming a reservoir, and
    c) a drain tube in fluid communication with said reservoir.

15. The device defined in claim 13, wherein at least one of said filters is pleated.

16. The device defined in claim 7, wherein said uppermost end cap comprises a lower annular groove in sealing communication with the uppermost of said plurality of tubular filter elements, and an opening to allow a mounting rod to pass through.

17. The device defined in claim 16, wherein said lowermost end cap has an upper annular groove, a lower annular sealing groove opposite said upper annular groove, and a gasket mounted in said lower annular sealing groove.

18. A filter assembly comprising a filter element as defined in claim 1 including inlet means for introducing the fluid to be filtered to the interior of said filter element at the inside thereof such that the fluid will flow from the inside to the outside of the filter element, and wherein said filter element has its ends substantially closed by a pair of closure members, said filter element being mounted inside a suitable housing having said inlet means sealingly communicating with the interior of said filter, and said housing having outlet means communicating with the atmosphere.

* * * * *